(12) United States Patent
Breulmann et al.

(10) Patent No.: US 6,835,775 B2
(45) Date of Patent: Dec. 28, 2004

(54) THERMOPLASTIC MOLDING COMPOUNDS WITH IMPROVED IMPACT RESISTANCE

(75) Inventors: Michael Breulmann, Mannheim (DE); Sabine Oepen, Ellerstadt (DE); Norbert Niessner, Friedelsheim (DE); Norbert Güntherberg, Speyer (DE); Wil Duijzings, Ludwigshafen (DE); Graham Edmund Mc Kee, Neustadt (DE); Peter Rossmanith, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 38 days.

(21) Appl. No.: 10/275,012

(22) PCT Filed: Apr. 30, 2001

(86) PCT No.: PCT/EP01/04861

§ 371 (c)(1),
(2), (4) Date: Oct. 31, 2002

(87) PCT Pub. No.: WO01/83574

PCT Pub. Date: Nov. 8, 2001

(65) Prior Publication Data

US 2003/0105225 A1 Jun. 5, 2003

(30) Foreign Application Priority Data

May 3, 2000 (DE) .......................................... 10021565

(51) Int. Cl.$^7$ ............................................. C08F 255/00
(52) U.S. Cl. ............................. 525/69; 525/70; 525/71; 525/193; 525/316
(58) Field of Search ............................. 525/69, 70, 71, 525/193, 316

(56) References Cited

U.S. PATENT DOCUMENTS

| | | | |
|---|---|---|---|
| 3,944,630 A | 3/1976 | Ide et al. | 260/879 |
| 4,487,890 A | 12/1984 | Kishida et al. | 525/193 |
| 5,969,041 A | * 10/1999 | Eichenauer et al. | 525/71 |
| 6,323,279 B1 | 11/2001 | Guntherberg et al. | 525/70 |

FOREIGN PATENT DOCUMENTS

| | | |
|---|---|---|
| CA | 1 056 975 | 6/1979 |
| DE | 24 41 107 | 3/1975 |
| DE | 24 27 960 | 6/1975 |
| DE | 196 30 061 | 1/1998 |
| DE | 197 28 629 | 1/1999 |
| EP | 0 022 200 | 1/1981 |
| EP | 0 058 316 | 8/2002 |
| WO | WO 99/01489 | 1/1999 |

OTHER PUBLICATIONS

DW0820070419E Derwent Abstract No. 70419 (2002).
DW0810006022D Derwent Abstract No. 06022 (2002).
DW99072041/07 Derwent Abstract (2002).
DW98101899/10 Derwent Abstract (2002).
Keppler et al. "Untersuchung über die Agglomeration von Polymerisatlatices" Die Angwandte Makromolekulare Chemie 2 No. 20 (1968) pp. 1–25.

* cited by examiner

Primary Examiner—James J. Seidleck
Assistant Examiner—Olga Asinovsky
(74) Attorney, Agent, or Firm—Keil & Weinkauf

(57) ABSTRACT

The graft copolymer made from a1: from 10 to 90% by weight of a particulate graft base A1, made from a particulate emulsion polymer with a glass transition temperature below 0° C. made from
  a11: from 70 to 100% by weight of butadiene or of at least one $C_{1\text{-}8}$-alkyl acrylate, or of mixtures of these, as component A11,
  a12: from 0 to 20% by weight of at least one polyfunctional crosslinking monomer, as component A12,
  a13: from 0 to 30% by weight of other copolymerizable monomers, as component A13, the total amount of these being 100% by weight,
a2: from 10 to 90% by weight of a graft A2 made from the following monomers, the amounts being based on A2,
  a21: from 60 to 100% by weight of at least one vinylaromatic monomer, or of a (meth)acrylic ester or of mixtures of these, as component A21, and
  a22: from 0 to 40% by weight of at least one ethylenically unsaturated monomer, as component A22, has a median particle diameter of from 130 to 500 nm and has polymodal particle size distribution in which less than 40% by weight of the particles are present in any particle size range of width 50 nm.

9 Claims, 1 Drawing Sheet

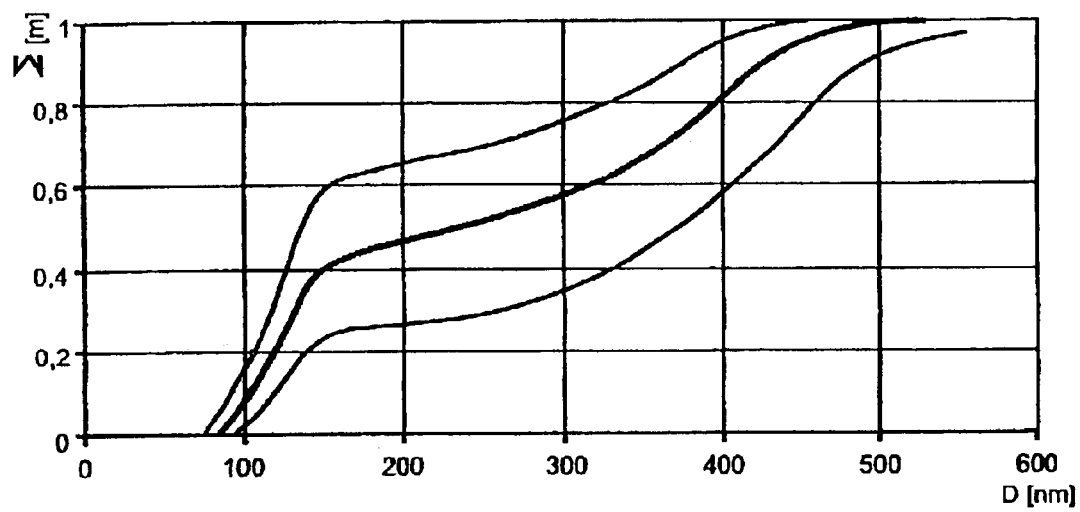

THERMOPLASTIC MOLDING COMPOUNDS WITH IMPROVED IMPACT RESISTANCE

The invention relates to particulate emulsion polymers, graft copolymers thereof and molding compositions comprising these, which have improved impact strength. The invention further relates to a process for preparing the emulsion polymers and graft copolymers, and also to the use of the graft copolymers and of the thermoplastic molding compositions.

Impact-modified thermoplastic molding compositions such as acrylonitrile-butadiene-styrene (ABS) copolymers and acrylate-styrene-acrylonitrile (ASA) copolymers have advantageous mechanical properties and are therefore used in a wide variety of applications.

These are generally prepared by first preparing a rubber latex which, for example, after grafting can be introduced into a polymer matrix.

Rubber latices produced during homo- or copolymerization of butadiene frequently have particle diameters of the order of from 50 to 150 nm. ABS polymers prepared using rubbers of this type frequently have relatively low toughness. It is therefore desirable to produce and use rubber latices with larger particles. The small-particle rubber latex used is therefore preferably used in agglomerated form in order to achieve improved mechanical properties. DE-A-24 27 960 relates to a process for preparing impact-modified thermoplastic molding compositions based on rubbery polymers. After initial emulsion polymerization of butadiene or acrylic esters, the resultant rubber latex is agglomerated at least to some extent by adding an agglomeration agent based on an acrylate polymer dispersion. This is followed by grafting with styrene, acrylonitrile and/or methyl methacrylate, and the resultant graft rubber is introduced into a polymer matrix.

The use of graft rubbers with bimodal particle size distribution has also been described in DE-A-196 30 061, for example. This specification also gives an overview of various compositions and preparation processes for the thermoplastic molding compositions.

DE-A 197 28 629 describes ABS molding compositions with two different matrix polymers.

The agglomeration of polymer latices is generally described in "Die Angewandte Makromolekulare Chemie" 2, 1968, 1–25 (Nr. 20).

It is an object of the present invention to provide particulate emulsion polymers and graft copolymers obtainable therefrom and thermoplastic molding compositions which have better notch impact strength than known molding compositions. They should also have an advantageous combination of mechanical properties, such as toughness, penetration energy, flowability and surface gloss.

We have found that this object is achieved by means of a graft copolymer made from a1: from 10 to 90% by weight of a particulate graft base A1, made from a particulate emulsion polymer with a glass transition temperature below 0° C. made from a11: from 70 to 100% by weight of butadiene or of at least one $C_{1-8}$-alkyl acrylate, or of mixtures of these, as component A11, a12: from 0 to 20% by weight of at least one polyfunctional crosslinking monomer, as component A12, a13: from 0 to 30% by weight of other copolymerizable monomers, as component A13, the total amount of these being 100% by weight, a2: from 10 to 90% by weight of a graft A2 made from the following monomers, the amounts being based on A2, a21: from 60 to 100% by weight of at least one vinylaromatic monomer, or of a (meth)acrylic ester or of mixtures of these, as component A21, and a22: from 0 to 40% by weight of at least one ethylenically unsaturated monomer, as component A22, which has a median particle diameter of from 130 to 500 nm and has polymodal particle size distribution in which less than 40% by weight of the particles are present in any particle size range of width 50 nm.

The graft copolymers are preferably incorporated into thermoplastic molding compositions.

The object is further achieved by means of a thermoplastic molding composition comprising, based on the amount of components A and B and, where appropriate, C and/or D, which gives 100% by weight in total, a: from 10 to 90% by weight of a graft copolymer as defined above, as component A, b: from 10 to 90% by weight of at least one amorphous polymer, as component B, c: from 0 to 80% by weight of polycarbonates, polyamides, polyesters, polyether ketones, polyoxyalkylenes or polyarylene sulfides, as component C, and d: from 0 to 50% by weight of fibrous or particulate fillers or mixtures of these, as component D.

According to the invention, it has been found that thermoplastic molding compositions with improved mechanical properties, in particular with increased notch impact strength, can be obtained if the graft copolymers used for their preparation have polymodal particle size distribution in which less than 40% by weight, preferably less than 37.5% by weight, with preference less than 35% by weight, particularly preferably less than 32.5% by weight, in particular less than 30% by weight, of the particles are present in any particle size range of width 50 nm. Unless otherwise stated, the median particle diameter here is based on weight. In particular, it is the $d_{50}$ of the integral weight distribution, determined with the aid of an ultracentrifuge. The particle size distribution is likewise preferably determined with the aid of an ultracentrifuge as described in more detail below.

According to the invention, it has been found that a broad particle size distribution of this type leads to advantageous thermoplastic molding compositions.

In determining the particle size distribution, the cumulative mass or weight is generally plotted as a function of particle size. If any desired particle size range of width 50 nm is then selected, then according to the invention the increase in cumulative weight or mass is below 40% by weight, preferably below 37.5% by weight, with preference below 35% by weight, particularly preferably below 32.5% by weight, in particular below 30% by weight. The particle sizes in an agglomerated latex are usually within the region up to 1000 nm. The 50 nm range is therefore generally within this region of particle size up to 1000 nm. According to the invention, the above condition has to be fulfilled for particle size windows of width 50 nm at any position which may be chosen.

In the particulate emulsion polymer it is preferable for the ratio $D_w/D_n$ of ponderal median particle size $d_{50}$ to numeric median particle size $d_{50}$ to be <5, particularly preferably <4, in particular <3. The ponderal median d of the particle size is determined here by means of an analytical ultracentrifuge, and the numeric median particle size is likewise determined by means of an analytical ultracentrifuge, see W. Scholtan, H. Lange, Kolloid-Z. und Z. Polymere, 250 (1972), pages 782 to 796.

The ultracentrifuge measurement gives the cumulative mass distribution of particle diameter in a specimen. From this it is possible to deduce what percentage by weight of the particles have a diameter equal to or smaller than a particular size.

The $d_{10}$ is the particle diameter relative to which the diameter of 10% by weight of all of the particles is smaller and that of 90% by weight of all of the particles is larger. Conversely, 90% by weight of all of the particles have a diameter smaller than the diameter corresponding to the $d_{90}$, and 10% by weight of all of the particles have a diameter larger than the diameter corresponding to the $d_{90}$. The ponderal median particle diameter $d_{50}$ and the volume median particle diameter $d_{50}$ are diameters relative to which the diameters of 50% by weight and, respectively, 50% by volume of all of the particles are larger, and those of 50% by weight and, respectively, 50% by volume are smaller. $d_{10}$, $d_{50}$ and $d_{90}$ describe the width Q of the particle size distribution, where $Q=(d_{90}-d_{10})/d_{50}$. The smaller Q is, the narrower the distribution.

The plot of cumulative weight against particle size preferably rises continuously. This means that over the course of the function from 0 to 100% by weight there is no plateau, but rather the curve is constantly rising.

The graft copolymers of the invention may be prepared by
1) polymerizing the monomers A11 and, where appropriate, A12 and A13, in aqueous emulsion to give a rubber latex with a median particle diameter of not more than 150 nm,
2) agglomerating the rubber latex so that the agglomerated grafted rubber latex subsequently has a median particle diameter of from 130 to 500 nm, preferably from 130 to 450 nm, in particular from 130 to 400 nm (ponderal median), by adding an agglomeration latex based on an acrylate polymer dispersion, and then
3) polymerizing the monomers of the graft in aqueous emulsion in the presence of the agglomerated latex, the graft making up from 10 to 90% by weight and the agglomerated latex making up from 10 to 90% by weight, based on solids.

The particulate emulsion polymers or graft polymers may generally be prepared by a process as described in DE-A-24 27 960.

First, the base stage consists in preparing a rubber latex. This base rubber preferably has a glass transition temperature below −20° C., particularly preferably below −30° C. Use is made of a monomer mixture made from a11: from 70 to 100% by weight, preferably from 80 to 100% by weight, of butadiene or of at least one $C_{1-8}$-alkyl acrylate, or of mixtures of these, as component A11,
a12: from 0 to 20% by weight, preferably from 0 to 10% by weight, of at least one polyfunctional crosslinking monomer, as component A12, and
a13: from 0 to 30% by weight, preferably from 0 to 20% by weight, of other copolymerizable monomers, as component A13, where the total amount of components A11, A12 and A13 is 100% by weight.

As component A11 it is preferable to use butadiene, n-butyl acrylate and/or ethylhexyl acrylate.

In principle, any crosslinking monomer can be used as component A12. Examples of polyfunctional crosslinking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate, and allyl methacrylate. Dicyclopentadienyl acrylate (DCPA) has proven to be a particularly useful crosslinking monomer.

Other copolymerizable monomers A13 are preferably monomers also present in the matrix polymer of the molding composition. Examples of these are vinylaromatic monomers, such as styrene, styrene derivatives of the formula

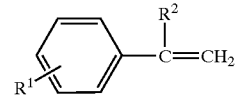

where $R^1$ and $R^2$ are hydrogen or $C_1$–$C_8$-alkyl;
acrylonitrile, methacrylonitrile;
$C_1$–$C_4$-alkyl methacrylates, such as methyl methacrylate, and also the glycidyl esters, glycidyl acrylate and glycidyl methacrylate;
N-substituted maleimides such as N-methyl-, N-phenyl- and N-cyclohexylmaleimide;
acrylic acid, methacrylic acid, and also dicarboxylic acids, such as maleic acid, fumaric acid and itaconic acid, and anhydrides of these, such as maleic anhydride;
nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide and methacrylamide;
aromatic and araliphatic esters of acrylic acid or methacrylic acid, such as phenyl acrylate, phenyl methacrylate, benzyl acrylate, benzyl methacrylate, phenylethyl acrylate, 2-phenylethyl methacrylate, 2-phenoxyethyl acrylate and 2-phenoxyethyl methacrylate;
unsaturated ethers, such as vinyl methyl ether, and also mixtures of these.

Preferred examples of these monomers are MMA, styrene, acrylonitrile, MA, glycidyl (meth)acrylate, acrylamide, methacrylamide, imides and vinyl ethers, and also methylstyrene and methacrylonitrile.

For component A13 it is preferable to use from 0 to 30% by weight of styrene, preferably from 0 to 20% by weight, with preference from 5 to 15% by weight.

The monomer mixture is polymerized in the presence of emulsifiers, for example alkali metal salts of alkyl- or alkylarylsulfonates, of alkyl sulfates, or of fatty alcohol sulfonates or fatty acids having from 10 to 30 carbon atoms, in water. It is preferable to use sodium salts of alkylsulfonates or fatty acids having from 12 to 18 carbon atoms. The amounts used of the emulsifiers are from 0.3 to 5% by weight, preferably from 0.35 to 2.0% by weight, based on the monomers. Use may also be made of the usual buffer salts, such as sodium bicarbonate, citrate buffers, or else systems such as sodium pyrophosphate.

The polymerization is preferably carried out at from 30 to 90° C. in the presence of conventional initiators, such as persulfates or organic peroxides. Molecular weight regulators, such as mercaptans or terpinols, may be added where appropriate.

The solids content in the aqueous dispersion after the polymerization is preferably from 25 to 50% by weight, particularly preferably from 30 to 45% by weight.

The particle size obtained after polymerization is generally below 150 nm.

In the second step, the rubber latex obtained in the first step is agglomerated. This preferably occurs by way of addition of an acrylate polymer dispersion, as described in DE-A-24 27 960. It is particularly preferable to use copolymers made from ethyl acrylate and methacrylamide and having a proportion of from 0.1 to 20% by weight of methacrylamide. The concentration of the acrylate polymers in the agglomeration dispersion is preferably from 3 to 40% by weight, particularly preferably from 5 to 20% by weight. The particle size is preferably approximately within the range of particle size of the latex to be agglomerated.

The ratio between the median particle size of the agglomeration latex and the median particle size of the substrate latex is preferably from 0.2 to 2, particularly preferably from 0.5 to 1.5.

It is preferable to carry out the agglomeration at from 20 to 120° C., particularly from 30 to 100° C. The manner of adding the agglomeration latex is preferably such that from 1 to 1/100 of the total amount of the agglomeration latex to be added is introduced per minute. The agglomeration time is preferably from 1 minute to 2 hours, particularly preferably from 10 to 60 minutes.

The amount of the agglomeration latex, based on the latex to be agglomerated, is preferably from 0.1 to 20% by weight, preferably from 0.5 to 10% by weight, in particular from 1 to 5% by weight, based on solids.

The space-time yield and cycle time of the polymerization process can be improved by way of the agglomeration.

To prepare the graft copolymers of the invention, the resultant (partially) agglomerated latex is grafted. The proportion of the graft shell in the graft copolymer is preferably from 10 to 90% by weight. The graft shell or graft is preferably built up from 65–83% by weight of styrene or from a (meth)acrylic ester, in particular styrene, as component A21, and from 17 to 35% by weight of acylonitrile.

The grafting may be carried out with the addition of any desired regulators or initiators. Use may be made of peroxide initiators or redox initiators, for example. The grafting is also described in DE-A-24 27 960.

To prepare thermoplastic molding compositions, the graft copolymers of the invention are preferably mixed with at least one matrix polymer and, where appropriate, with other ingredients. These are described below:

Component B

Component B is an amorphous polymer, for example an SAN (styrene-acrylonitrile) polymer, an AMSAN (α-methylstyrene-acrylonitrile) polymer, a styrene-maleimide polymer, or a SMSAN (styrene-maleic acid (anhydride) acrylonitrile) polymer.

Component B is preferably a copolymer made from
b1: from 60 to 100% by weight, preferably from 65 to 80% by weight, of units of a vinylaromatic monomer, preferably of styrene, of a substituted styrene or of a (meth) acrylic ester or of mixtures of these, in particular of styrene and/or of α-methylstyrene, as component B1,
b2: from 0 to 40% by weight, preferably from 20 to 35% by weight, of units of an ethylenically unsaturated monomer, preferably of acrylonitrile or of methacrylonitrile or of methyl methacrylate (MMA), in particular of acrylonitrile, as component B2.

In one embodiment of the invention, its structure comprises from 60 to 99% by weight of vinylaromatic monomers and from 1 to 40% by weight of at least one of the other monomers given.

Component B is preferably an amorphous polymer as described above as graft A2. In one embodiment of the invention, the component B used is a copolymer of styrene and/or α-methylstyrene with acrylonitrile. The acrylonitrile content in these copolymers of component B is from 0 to 40% by weight, preferably from 20 to 35% by weight, based on the total weight of component B. The free, ungrafted styrene-acrylonitrile copolymers produced during the graft copolymerization to prepare component A also count as part of component B. Depending on the conditions selected for the graft copolymerization to prepare the graft copolymer A, it can be possible for a sufficient proportion of component B to have been formed during the graft copolymerization itself. However, it is generally necessary for the products obtained during the graft copolymerization to be blended with additional, separately prepared component B.

This additional, separately prepared component B may preferably be a styrene-acrylonitrile copolymer, an α-methylstyrene-acrylonitrile copolymer, or an α-methylstyrene-styrene-acrylonitrile terpolymer. These copolymers may be used individually or else as a mixture for component B, and therefore the additional, separately prepared component B of the molding compositions used according to the invention may, for example, be a mixture made from a styrene-acrylonitrile copolymer and from an α-methylstyrene-acrylonitrile copolymer. In the event that component B of the molding compositions used according to the invention is composed of a mixture made from a styrene-acrylonitrile copolymer and from an α-methylstyrene-acrylonitrile copolymer, the acrylonitrile contents of the two copolymers should preferably differ by not more than 10% by weight, preferably not more than 5% by weight, based on the total weight of the copolymer. Component B preferably has a viscosity number of from 40 to 150, preferably from 50 to 120, in particular from 60 to 100. The viscosity number is determined here to DIN 53 726, dissolving 0.5 g of material in 100 ml of dimethylformamide.

The mixing of components A and B and, where appropriate, C and D may take place in any desired manner by any known method. If, for example, components A and B have been prepared by emulsion polymerization, it is possible for the polymer dispersions obtained to be mixed with one another and then the polymers to be precipitated together and the polymer mixture worked up. However, it is preferable for components A and B to be blended by joint extrusion, kneading or roll-milling of the components, e.g. at from 180 to 400° C., the components having been isolated in advance, if required, from the solution or aqueous dispersion obtained during the polymerization. It is also possible for the products obtained in aqueous dispersion from the graft copolymerization (component A) to be only partially dewatered and to be in wet crumb form when mixed with component B, in which case complete drying of the graft copolymers then takes place during the mixing.

In one preferred embodiment, the molding compositions comprise, besides components A and B, additional components C and/or D, and also, where appropriate, other additives, as described below.

Component C

The polymers of component C of the molding composition are preferably at least one polymer selected from among polycarbonates, semicrystalline polyamides, partly aromatic copolyamides, polyesters, polyether ketones, polyoxyalkylenes and polyarylene sulfides. It is also possible to use polymer mixtures.

Semicrystalline and preferably linear polyamides, such as nylon-6, nylon-6,6, nylon-4,6, and nylon-6,12, and semicrystalline copolyamides based on these components are suitable as component C of the molding composition of the invention. It is also possible to use semicrystalline polyamides whose acid components are composed entirely or to some extent of adipic acid and/or terephthalic acid and/or isophthalic acid and/or suberic acid and/or sebacic acid and/or azelaic acid and/or dodecanedicarboxylic acid and/or of a cyclohexanedicarboxylic acid, and whose diamine component is composed entirely or to some extent in particular of m- and/or p-xylylenediamine and/or hexamethylenediamine and/or 2,2,4- and/or 2,4,4-trimethylhexamethylenediamine and/or isophoronediamine, and whose compositions are in principle known from the prior art (cf. Encyclopedia of Polymers, Vol. 11, pp. 315 et seq.).

Other components C which may be used are polyesters, preferably aromatic-aliphatic polyesters. Examples of these are polyalkylene terephthalates, e.g. those based on ethylene glycol, 1,3-propanediol, 1,4-butanediol, 1,6-hexanediol or 1,4-bis(hydroxymethyl)cyclohexane, and also polyalkylene naphthalates.

Other components C which may be used are aromatic polyether ketones, e.g. those described in the patents GB 1 078 234, U.S. Pat. No. 4,010,147, EP-A-0 135 938, EP-A-0 292 211, EP-A-0 275 035, EP-A-0 270 998, EP-A-0 165 406 and in publication C. K. Sham et al., Polymer 29/6, 1016–1020 (1988).

Other components C which may be used in the molding compositions are polyoxyalkylenes e.g. polyoxymethylene, and oxymethylene polymers.

Other suitable components C are the polyarylene sulfides, in particular polyphenylene sulfide.

Suitable polycarbonates C are known per se. They preferably have a molar mass (weight-average $M_w$, determined by gel permeation chromatography in tetrahydrofuran against polystyrene standards) within the range from 10,000 to 60,000 g/mol. They can be obtained by the processes of DE-B-1 300 266 by interfacial polycondensation, for example, or by the process of DE-A-1 495 730, by reacting diphenyl carbonate with bisphenols. Preferred bisphenol is 2,2-di(4-hydroxyphenyl)propane, generally, and also below, termed bisphenol A.

Instead of bisphenol A it is also possible to use other aromatic dihydroxy compounds, in particular 2,2-di(4-hydroxyphenyl)pentane, 2,6-dihydroxynaphthalene, 4,4'-dihydroxydiphenyl sulfone, 44'-dihydroxydiphenyl ether, 4,4'-dihydroxydiphenyl sulfite, 4,4'-dihydroxydiphenylmethane, 1,1-di(4-hydroxyphenyl)ethane, 4,4-dihydroxybiphenyl or dihydroxydiphenylcycloalkanes, preferably dihydroxydiphenylcyclohexanes or dihydroxycyclopentanes, in particular 1,1-bis(4-hydroxyphenyl)-3,3,5-trimethylcyclohexane, or else mixtures of the abovementioned dihydroxy compounds.

Particularly preferred polycarbonates are those based on bisphenol A or bisphenol A together with up to 80 mol % of the abovementioned aromatic dihydroxy compounds.

It is also possible to use copolycarbonates as in U.S. Pat. No. 3,737,409, and of particular interest here are copolycarbonates based on bisphenol A and di(3,5-dimethyldihydroxyphenyl) sulfone, these having high heat resistance. It is also possible to use mixtures of different polycarbonates.

According to the invention, the average molar masses (weight-average $M_w$, determined by gel permeation chromatography in tetrahydrofuran against polystyrene standards) of the polycarbonates C are within the range from 10,000 to 64,000 g/mol. They are preferably within the range from 15,000 to 63,000 g/mol, in particular within the range from 15,000 to 60,000 g/mol. This means that the polycarbonates C have relative solution viscosities within the range from 1.1 to 1.3, preferably from 1.15 to 1.33, measured in 0.5% strength by weight solution in dichloromethane at 25° C. The relative solution viscosities of the polycarbonates used preferably differ by not more than 0.05, in particular not more than 0.04.

The polycarbonates C may be used either as regrind or in granular form. They are present as component C in amounts of from 0 to 50% by weight, preferably from 10 to 40% by weight, based in each case on the entire molding composition.

In one embodiment of the invention, the addition of polycarbonates leads, inter alia, to higher heat resistance and improved cracking resistance in the molding compositions.

Component D

As component D, preferred thermoplastic molding compositions comprise from 0 to 50% by weight, preferably from 0 to 40% by weight, in particular from 0 to 30% by weight, of fibrous or particulate fillers or mixtures of these, based in each case on the entire molding composition. These are preferably commercially available products.

The amounts usually used of reinforcing agents, such as carbon fibers or glass fibers, are from 5 to 50% by weight, based on the entire molding composition.

The glass fibers used may be made from E, A or C glass, and have preferably been coated with a size and with a coupling agent. Their diameter is generally from 6 to 20 $\mu$m. Use may be made either of continuous-filament fibers (rovings) or else of chopped glass fibers (staple) of length from 1 to 10 $\mu$m, preferably from 3 to 6 $\mu$m.

Fillers or reinforcing materials may also be added, for example glass beads, mineral fibers, whiskers, aluminum oxide fibers, mica, powdered quartz or wollastonite.

In addition, metal flakes (e.g. aluminum flakes from Transmet Corp.), metal powders, metal fibers, metal-coated fillers, e.g. nickel-coated glass fibers, or else other additives which screen out electromagnetic waves, may be admixed with the molding compositions of the invention. Aluminum flakes (K 102 from Transmet) are particularly suitable for the EMI (electromagnetic interference) purposes. The compositions may also be mixed with additional carbon fibers or carbon black, in particular conductivity black, or with nickel-coated carbon fibers.

The molding compositions of the invention may also comprise other additives commonly used for polycarbonates, for SAN polymers, for graft copolymers or for mixtures of these. Examples of additives of this type are: dyes, pigments, colorants, antistats, antioxidants, heat stabilizers, light stabilizers, hydrolysis stabilizers and stabilizers to raise chemicals resistance, agents to inhibit thermal decomposition and in particular lubricants, these being useful for producing moldings. These other additives may be metered in at any stage of the preparation or production process, but preferably at an early juncture, so that early use can be made of their stabilizing effects (or other specific effects).

Suitable stabilizers are the usual hindered phenols, and also vitamin E and/or compounds of similar structure, and also butylated condensation products of p-cresol and dicyclopentadiene, e.g. Wingstay® from Goodyear. HALS stabilizers (hindered amine light stabilizers), benzophenones, resorcinols, salicylates, benzotriazoles and other compounds are also suitable (for example Irganox®, Tinuvin®, such as Tinuvin® 770 (HALS absorber, bis(2,2,6,6-tetramethyl-4-piperidyl) sebacate) or Tinuvin®P (UV absorber—(2H-benzotriazol-2-yl-4-methylphenol), Topanol®). The amounts usually used of these compounds are up to 2% by weight (based on the entire mixture).

Suitable lubricants and mold-release agents are stearic acids, stearyl alcohol, stearic esters, amide waxes (bisstearylamide), polyolefin waxes and/or generally higher fatty acids, derivatives of these and appropriate fatty acid mixtures having from 12 to 30 carbon atoms. The amounts of these additives are within the range from 0.05 to 5% by weight.

Other additives which may be used are silicone oils, oligomeric isobutylene and similar substances, the usual amounts being from 0.001 to 5% by weight. Use may also be made of pigments, dyes, color brighteners, such as ultramarine blue, phthalocyanines, titanium dioxide, cadmium sulfides, or derivatives of perylenetetracarboxylic acid.

The amounts usually used of processing aids and stabilizers, such as UV stabilizers, lubricants and antistats, are from 0.01 to 5% by weight, based on the entire molding composition.

The molding compositions may be processed to give moldings, semifinished products or films.

In one embodiment of the invention, these may be produced by known thermoplastic processing methods from the thermoplastic molding compositions used according to the invention. They may in particular be produced by thermoforming, extrusion, injection molding, calendering, blow molding, compression molding, sintering or pressure sintering, preferably by injection molding.

The examples below further illustrate the invention.

EXAMPLES

Polybutadiene Emulsion

The polybutadiene latex is prepared as in Example 1.1, page 12 (graft base) of DE-A 197 28 629.

The latex has the following properties:
Solids content: 44%
$D_{50}$ ponderal: 100 nm
$D_{90}-D_{10}/D_{50}=0.55$ Agglomeration and Grafting 227 parts of the polybutadiene latex are diluted with 11 parts of water and heated to 65° C. To agglomerate the latex, 20 parts of an aqueous dispersion of an ethyl acrylate copolymer containing 96% by weight of ethyl acrylate and 4% by weight of methacrylamide are metered in. The solids content of this dispersion is 10% by weight, based on the dispersion.

The resultant polybutadiene latex is heated to 75° C. and mixed with 9.5 parts of 10% strength by weight potassium stearate solution. 0.12 part of potassium peroxodisulfate and 10 parts of a mixture made from styrene and acrylonitrile are added. The weight ratio of styrene to acrylonitrile in this mixture is 8:2. 15 minutes after the start of the grafting reaction, a mixture made from 41 parts of styrene and 10 parts of acrylonitrile is metered in over a period of 3 hours. Once the feed has ended, 0.12 part of potassium peroxodisulfate is again added, and polymerization is continued for 90 minutes at 80° C.

The particle size distribution obtained after agglomeration and grafting is given in FIG. 1, in which the x axis plots the particle diameter D in nm and the y axis plots the cumulative percentage proportion of the particles as Σ[m].

The resultant graft polymer is precipitated at 95° C. in a magnesium sulfate solution and filtered off with suction. By means of an extruder, the moist graft rubber is incorporated into an SAN matrix which contained 24% of acrylonitrile and 76% of styrene. The ratio by weight here between the grafted polybutadiene and the SAN matrix is 3:7.

Example 1

(Comparative Example)

Agglomeration latex composed of 96% by weight of ethyl acrylate and 4% by weight of methacrylamide, $D_{50}$=85 nm (ponderal)

Example 2

(Inventive)

Agglomeration latex composed of 94% by weight of ethyl acrylate and 6% by weight of methacrylamide, $D_{50}$=82 nm (ponderal)

Example 3

(Inventive)

Agglomeration latex composed of 92% by weight of ethyl acrylate and 8% by weight of methacrylamide, $D_{50}$=87 nm (ponderal) The particle size distributions in FIG. 1, taken from above to below, correspond to Examples 1, 2 and 3.

Test methods

Preparation of Thermoplastic Molding Compositions and Production of Test Specimens The components were intimately mixed at 240° C. and 250 rpm in a ZSK extruder from Werner+Pfleiderer, with melting, and discharged and pelletized. Test specimens were injection molded from the pellets.

Determination of Mechanical Properties

Charpy notch impact strength

On 80×10×4 mm test specimens at −40° C. and 23° C. to ISO 179 1eA

MVR flowability

On pellets at 220° C. and with 10 kg load to ISO 1133 B

Puncture

Penetration energy determined to ISO 6603-2

TABLE 1

Results of mechanical tests

|  | Example 1 Comparative example | Example 2 Inventive | Example 3 Inventive |
|---|---|---|---|
| Notch impact strength 23° C. (kJ/m$^2$) | 13.6 | 16.4 | 21.3 |
| Notch impact strength −40° C. (kJ/m$^2$) | 7.9 | 8.4 | 9.7 |
| Puncture (Nm) | 8.4 | 17.1 | 31.0 |
| MVR 220/10 (ml/10 min) | 11.5 | 12.5 | 13.5 |

What is claimed is:

1. A process for preparing graft copolymers made from
   a1: from 10 to 90% by weight of a particulate graft base A1, made from a particulate emulsion polymer with a glass transition temperature below 0° C. made from
      a11: from 70 to 100% by weight of butadiene or of at least one $C_{1-8}$-alkyl acrylate, or of mixtures of these, as component A11,
      a12: from 0 to 20% by weight of at least one polyfunctional crosslinking monomer, as component A12,
      a13: from 0 to 30% by weight of other copolymerizable monomers, as component A13, the total amount of these being 100% by weight,
   a2: from 10 to 90% by weight of a graft A2 made from the following monomers, the amounts being based on A2,
      a21: from 60 to 100% by weight of at least one vinylaromatic monomer, or of a (meth)acrylic ester or of mixtures of these, as component A21, and
      a22: from 0 to 40% by weight of at least one ethylenically unsaturated monomer, as component A22,
which has a median particle diameter of from 130 to 500 nm and has polymodal particle size distribution in which less than 40% by weight of the particles are present in any particle size range of width 50 nm, by 1) polymerizing the monomers A11 and, where appropriate, A12 and A13, in aqueous emulsion to give a rubber latex with a median particle diameter of not more than 150 nm,
2) agglomerating the rubber latex so that the agglomerated grafted rubber latex subsequently has a median particle diameter of from 130 to 500 nm, by adding an agglomeration latex based on an acrylate polymer dispersion of copolymers made from ethytacrylate and methacrylamide and having a proportion of from 0.1 to 20% by weight of methacrylamide, wherein the ratio of the median particle size of the agglomeration latex to the median particle size of the substrate latex is from 0.2 to 2, and then
3) polymerizing the monomers of the graft in aqueous emulsion in the presence of the agglomerated latex, the graft making up from 10 to 90% by weight and the agglomerated latex making up from 10 to 90% by weight, based on solids.

2. A process as claimed in claim 1, wherein the amount of agglomeration latex, based on the latex to be agglomerated, is from 0.1 to 20% y weight, based on solids.

3. A graft copolymer, obtainable by the process as claimed in claim 1.

4. A graft copolymer as claimed in claim 3, wherein less than 37.5% by weight of the particles are present in any particle size range of with 50 nm.

5. A graft polymer as claimed in claim 3, wherein the ratio $D_w/D_n$ of ponderal median particle size to numeric median particle size is less than 5.

6. A graft polymer as claimed in claim 3, wherein the plot of cumulative weight against particle size rises continuously.

7. A thermoplastic molding composition comprising, based on the amount of components A and B and, where appropriate, C and/or D, which gives 100% by weight in total, a: from 10 to 90% by weight of a particulate graft copolymers defined in claim 3, as component A, b: from 10 to 90% by weight of at least one amorphous polymer, as component B, c: from 0 to 80% by weight of polycarbonates, polyamides, polyesters, polyether ketones, polyoxyalkylenes or polyarylene sulfides, as component C, and d: from 0 to 50% by weight of fibrous or particulate fillers or mixtures of these, as component D.

8. A molding, a semifinished product or a film made from molding compositions as claimed in claim 7.

9. A molding, a semifinished product or a film made from graft copolymers as claimed in claim 3.

* * * * *